United States Patent
Leistner et al.

(10) Patent No.: US 12,390,882 B2
(45) Date of Patent: Aug. 19, 2025

(54) PRE-WELDING ANALYSIS AND ASSOCIATED FIBER LASERS UTILIZING PRE-SELECTED SPECTRAL BANDWIDTHS THAT AVOID THE SPECTRUM OF AN ELECTRONIC TRANSITION OF A METAL/ALLOY VAPOR

(71) Applicants: IPG Photonics Corporation, Oxford, MA (US); EMPA Swiss Federal Laboratories for Materials Science and Technology, Thun (CH); Medtronic, Inc., Minneapolis, MN (US)

(72) Inventors: Matthias Leistner, Guemligen (CH); Sebastian Favre-Bulle, Morges (CH); Andrey Mashkin, Burbach (DE)

(73) Assignees: IPG Photonics Corporation, Oxford, MA (US); Medtronic, Inc., Minneapolis, MN (US); EMPA Swiss Federal Laboratories for Materials Science and Technology, Thun (CH)

(*) Notice: Subject to any disclaimer, the term of this patent is extended or adjusted under 35 U.S.C. 154(b) by 296 days.

(21) Appl. No.: 17/894,887

(22) Filed: Aug. 24, 2022

(65) Prior Publication Data
US 2023/0001509 A1    Jan. 5, 2023

Related U.S. Application Data

(60) Division of application No. 16/362,147, filed on Mar. 22, 2019, now Pat. No. 11,484,972, which is a
(Continued)

(51) Int. Cl.
*B23K 26/22*    (2006.01)
*B23K 26/12*    (2014.01)
(Continued)

(52) U.S. Cl.
CPC ........... *B23K 26/22* (2013.01); *B23K 26/123* (2013.01); *B23K 26/32* (2013.01);
(Continued)

(58) Field of Classification Search
CPC .... B23K 26/32; B23K 26/123; B23K 26/125; B23K 2103/14; H01S 3/06745;
(Continued)

(56) References Cited

U.S. PATENT DOCUMENTS 6,510,167 B1    1/2003    Jain et al.
6,525,872 B1    2/2003    Ziari et al.
(Continued)

FOREIGN PATENT DOCUMENTS

CN    101132103 A    2/2008
CN    103026276 A    4/2013
(Continued)

OTHER PUBLICATIONS

Final Office Action for U.S. Appl. No. 16/362,147, dated Mar. 14, 2022.
(Continued)

*Primary Examiner* — John J Norton
(74) *Attorney, Agent, or Firm* — JDI PATENT; Joshua D. Isenberg (57) ABSTRACT

The present invention benefits from the determination that pre-selected spectral bandwidths that avoid the spectrum of an electronic transition of a metal/alloy vapor allow for welds substantially free from detritus that may discolor the weld. Accordingly, the present invention provides analytical methods, welding methods and fiber lasers configured to provide high quality metal/alloy welds.

18 Claims, 7 Drawing Sheets

Example of optical schematic of an MM fiber oscillator

Related U.S. Application Data continuation of application No. PCT/EP2017/074146, filed on Sep. 23, 2017.

(60) Provisional application No. 62/398,768, filed on Sep. 23, 2016.

(51) Int. Cl.

| | | |
|---|---|---|
| *B23K 26/32* | (2014.01) | |
| *B23K 103/14* | (2006.01) | |
| *H01S 3/067* | (2006.01) | |
| *H01S 3/0804* | (2023.01) | |
| *H01S 3/094* | (2006.01) | |
| *H01S 3/0941* | (2006.01) | |

(52) U.S. Cl.
CPC ........ *H01S 3/06745* (2013.01); *H01S 3/0675* (2013.01); *H01S 3/0804* (2013.01); *H01S 3/094003* (2013.01); *H01S 3/0941* (2013.01); *B23K 2103/14* (2018.08); *H01S 3/094069* (2013.01); *H01S 3/09415* (2013.01); *H01S 2301/03* (2013.01)

(58) Field of Classification Search
CPC ................ H01S 3/0675; H01S 3/0804; H01S 3/094003; H01S 3/094007; H01S 3/094011; H01S 3/094015; H01S 3/094019; H01S 3/094023; H01S 3/0941; H01S 3/09415; H01S 3/094069; H01S 2301/03
See application file for complete search history.

(56) References Cited

U.S. PATENT DOCUMENTS

| | | |
|---|---|---|
| 7,593,435 B2 | 9/2009 | Gapontsev et al. |
| 7,718,917 B2 | 5/2010 | Wang et al. |
| 7,957,431 B2 | 6/2011 | Drodofsky et al. |
| 8,285,086 B2 | 10/2012 | Nishikawa et al. |
| 8,692,152 B2 | 4/2014 | Katayama et al. |
| 9,095,931 B2 | 8/2015 | Morikazu |
| 9,300,108 B2 | 3/2016 | Gapontsev et al. |
| 2004/0233941 A1 | 11/2004 | Fajardo et al. |
| 2006/0198398 A1 | 9/2006 | Fermann et al. |
| 2008/0144673 A1 | 6/2008 | Gapontsev |
| 2008/0267228 A1 | 10/2008 | Sacks et al. |
| 2010/0189392 A1 | 7/2010 | Rockwell et al. |
| 2012/0237162 A1 | 9/2012 | Thomas et al. |
| 2012/0325787 A1 | 12/2012 | Hamada et al. |
| 2014/0035910 A1 | 2/2014 | Wakai et al. |
| 2015/0314393 A1 | 11/2015 | Woo |
| 2016/0087392 A1* | 3/2016 | Mashkin ............... H01S 3/1603 372/5 |

FOREIGN PATENT DOCUMENTS

| | | |
|---|---|---|
| CN | 103878479 A | 6/2014 |
| CN | 103460525 B | 4/2015 |
| CN | 104602860 A | 5/2015 |
| CN | 103358026 B | 3/2017 |
| JP | H03157917 A | 7/1991 |
| JP | H11245063 A | 9/1999 |
| JP | 2000011830 A | 1/2000 |
| JP | 2003528339 | 9/2003 |
| JP | 2007125576 A | 5/2007 |
| JP | 3978066 B2 | 9/2007 |
| JP | 2008055456 A | 3/2008 |
| JP | 4114619 B2 | 7/2008 |
| JP | 4690967 B2 | 6/2011 |
| JP | 4873482 B2 | 2/2012 |
| JP | 5385509 B2 | 1/2014 |
| JP | 5595913 B2 | 9/2014 |
| KR | 970033389 U | 7/1997 |
| KR | 100241032 B1 | 3/2000 |
| KR | 20030041125 A | 5/2003 |
| RU | 2382734 C2 | 2/2010 |
| RU | 122208 U1 | 11/2012 |
| RU | 2538161 C2 | 1/2015 |
| RU | 2554337 C1 | 6/2015 |
| RU | 2591586 C2 | 7/2016 |
| WO | 0135136 A1 | 5/2001 |
| WO | 2003092131 A1 | 11/2003 |
| WO | 2004027939 A3 | 12/2006 |
| WO | 2011160234 A3 | 2/2012 |
| WO | 2012044285 A1 | 4/2012 |
| WO | 2014197509 A1 | 12/2014 |
| WO | 2018055144 A1 | 3/2018 |

OTHER PUBLICATIONS

International Search Report and Written Opinion for International Patent Application No. PCT/EP2017/074146.
Non-Final Office Action for U.S. Appl. No. 16/362,147, dated Month Day, Year.
Non-Final/Final Office Action for U.S. Appl. No. 16/362,147, dated Oct. 29, 2021.
Rule 94(3) Communication dated Feb. 17, 2022 in European Patent Application No. 17772693.2.
U.S. Appl. No. 62/398,768, filed Sep. 23, 2016.
Humphreys et al. "Infrared Spectra of Noble Gases (12000 to 19000 A)" J. of Research of the Nat'l Bureau of Standards, vol. 49, No. 2, Research Paper 2345 Published Aug. 1952.

* cited by examiner

Figure 1　　Weld-spot using a Nd:YAG (left) and off the shelf fiber laser 1070 +-5 nm (right) in Argon atmosphere (1 kW peak power, 1.5 ms pulse duration)

Figure 2　　Weld-spot using the modified narrow linewidth fiber laser (1064 ± 0.5 nm)

Figure 3    High-speed image of a typical plume observed with the narrow band 1064±0.5 nm fiber laser. The dynamics within the plume are indicated by the arrows in the right picture.

Figure 4    Plume expansion of the standard 1070±5 nm fiber laser (left) and the narrow band 1064±0.5 nm fiber laser (right)

Figure 5    No spot coloration was observed using a 1071.1±0.5 nm laser, hitting electronic transitions of Ti II at 1070.7 nm as well as Argon at 1071.3 and 1071.5 nm (1 kW peak power, 1.5 ms pulse duration).

Figure 6    Plume shape and spot coloration observed using Zirconium and the standard 1070±5 nm fiber laser hitting eleven electronic transitions of Zr I.

Figure 7 — Plume shape and spot coloration observed using Zirconium and the narrow band 1064±0.5 nm fiber laser hitting no electronic transitions of Zr I.

Figure 8 — Plume expansion and weld coloration using the standard 1070±5 nm fiber laser in Argon (left) and Helium atmosphere (right). The improved visual aspect is due to the unhindered plume expansion in case of the Helium atmosphere (lower density).

Figure 9     Location of electronic transitions (open circles) of Ti I vapor listed in the NIST database (top) and the Kurucz linelist (bottom).

Figure 10  Different laser emission profiles and location of Ti I electronic transitions (circles) in the 1060-1080 nm range with the respective oscillator strength (gf value) obtained from the Kurucz linelist.

Figure 11  Different laser emission profiles and location of Ti I electronic transitions (circles) having an oscillator strength (gf value) above the standard deviation within the 1060-1080 nm range.

Figure 12    Example of optical schematic of an MM fiber oscillator

Figure 12A An exemplary multimode active fiber

PRE-WELDING ANALYSIS AND ASSOCIATED FIBER LASERS UTILIZING PRE-SELECTED SPECTRAL BANDWIDTHS THAT AVOID THE SPECTRUM OF AN ELECTRONIC TRANSITION OF A METAL/ALLOY VAPOR

CLAIM OF PRIORITY

This application is a divisional of U.S. patent application Ser. No. 16/362,147 filed Mar. 22, 2019, which is a continuation of International Patent Application Number PCT/EP2017/074146 filed Sep. 23, 2017, the entire contents of which are incorporated herein by reference. International Patent Application Number PCT/EP2017/074146 claims the priority benefit of U.S. Provisional Patent Application No. 62/398,768 filed Sep. 23, 2016, the entire contents of which are incorporated herein by reference.

BACKGROUND OF THE INVENTION

1. Field of the Invention

The present invention relates to pre-welding analytical methods as well as methods and lasers for welding metals and metal alloys, and particularly titanium or titanium alloys, with a laser independent of any cover gas. Specifically, the present invention relates to the pre-determination of the spectrum of the electronic transition of metal vapor in a welding process and providing a narrow bandwidth fiber laser that eliminates optical interaction between the laser beam with the spectrum of the electronic transition of metal and metal alloys.

2. Description of the Related Art

Laser beam welding is a welding technique used to join multiple pieces of metal through the use of a laser. However, weld defects such as solidification cracks, porosity, material loss (spattering), bumps and dents (undercut), lack of penetration, coloration (oxidation) etc. might be unacceptable in some applications for functional or aesthetic reasons. Two of the Applicants of the present application have previous experience creating welding solutions with respect to complex welding problems. PCT/US2010/050626 (hereinafter the '626 APP) which was published on 5 Apr. 2012 as WO 2012/044285 A1 and whose contents is incorporated by reference in its entirety concerns the use of fiber lasers for welding titanium in combination with a cover gas. This application describes a method and a system for reducing contamination in the resulting plasma of a weld produced by a fiber laser. According to this application, the contamination in a weld can be reduced by narrowing the bandwidth of a fiber laser that is acting on a titanium or titanium alloy workpiece thus reducing or eliminating optical interaction between a laser beam with a so-called inert cover or shielding gas, preferably argon. It was postulated in this application that soot was produced by the interference of the fiber laser beam emission with the cover gas as the prior art use of a Nd:YAG laser in combination with an argon shielding (cover) gas produced limited, if any, soot.

Figure 1:
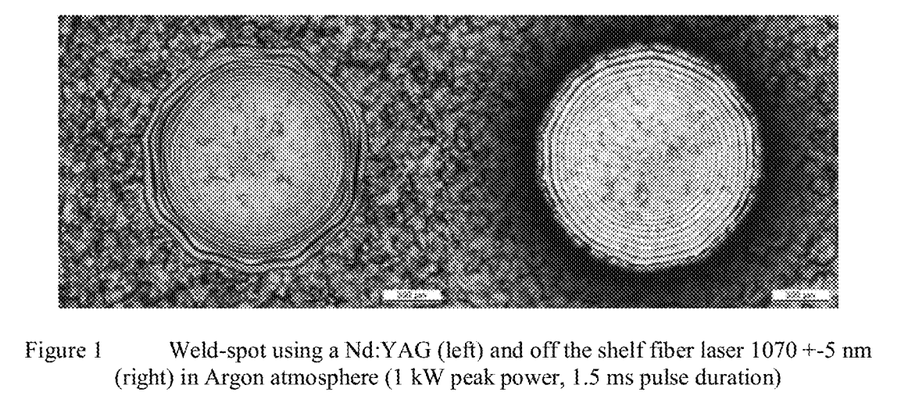
FIG. 1 shows a weld-spot using a Nd:YAG (left) and off the shelf fiber laser 1070+−5 nm (right) in Argon atmosphere (1 kW peak power, 1.5 ms pulse duration)

In particular, the '626 APP was directed to solving the problem that using an off-the-shelf fiber laser results in poor optical weld quality compared to a weld with a Nd:YAG laser (FIG. 1).

Figure 2:
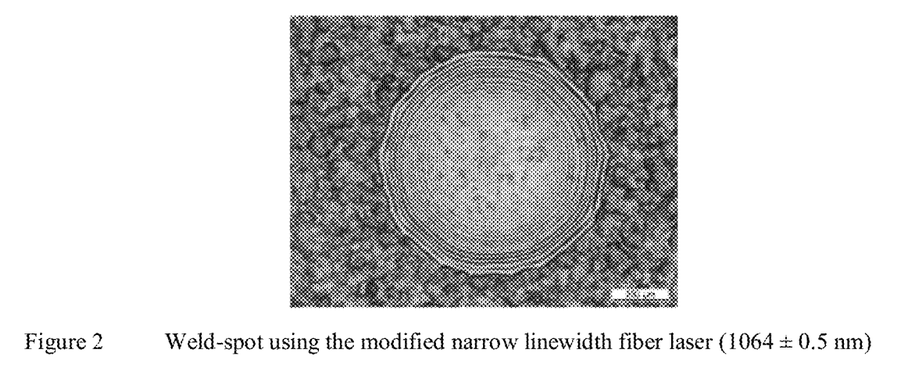
FIG. 2 shows a weld-spot using the modified narrow linewidth fiber laser (1064±0.5 nm)

The '626 APP provided that this effect was caused by interactions of the laser light with the electronic transitions of the cover gas, i.e. Argon at 1050.65 and 1067.36 nm or He at 1066.76 or 1082.91 nm. The '626 APP further taught changing the center wavelength and reducing the emission linewidth of the laser from 1070±5 nm to 1064±0.5 nm would avoid the interaction with the electronic levels of the cover gas and thereby secure a weld with good visual quality (FIG. 2).

The '626 APP further disclosed that the laser emission wavelength could additionally be tuned to minimize the interaction of the laser beam with the electronic levels of the ions of the weld material to further improve the visual aspect of the weld. One of disadvantages of the solution proposed in '626 APP is that the fiber laser systems works in a specific optimal configuration, including laser spectrum, which takes into account only effects of the interaction of the laser light with the electronic transitions of the cover gas (e.g. argon) as well as with the electronic levels of the ions of the weld material.

The present application sets forth the discovery that the '626 APP is not completely correct, that the soot or other detritus which caused coloration (resulting from oxidation, particle deposition and similar effects or their combinations) of the weld was not created by the interaction of the ions of the weld material or by the interaction of the spectrum of the laser with that of the cover gas. Nevertheless, the solution set forth herein below still requires the narrowband fiber lasers disclosed in the '626 APP.

The demands of providing narrowband, stable lasers equipped to provide sufficient power that are cost-efficient and not complicated has led one of the Applicants to develop multimode lasers that meet these difficult requirements. As provided in PCT/US2014/40754 which was published as WO 2014/197509 A1 on 11 Dec. 2014, the contents of which are incorporated by reference in its entirety, non-linear effects can cause unwanted spectral broadening of the laser emission spectrum where higher power densities are pursued.

The degree to which such lasers could be adapted had yet to be explored not to mention whether the quality of light, as opposed to that provided by a single mode laser, would be sufficient for welding.

Accordingly, there is a need for an improved system and method for pre-selecting a laser spectrum to for welding a metal/alloy as well as providing a related welding process and fiber lasers that can implement same.

SUMMARY OF THE INVENTION

The present invention provides a method of pre-selecting the parameters of a metal/alloy welding process independent of the spectral properties of a cover gas. This method includes determining the spectrum of an electronic transition of the metal/alloy vapor by analyzing an emission spectrum of a metal/alloy welding process using a broad bandwidth energy source; and selecting a laser wavelength and linewidth outside the spectrum of any electronic transition of the metal/alloy vapor. It follows that under certain circumstances that electronic transition spectra may be available in the literature and the first experimental step set forth above may not be necessary.

According to the present invention, a method of pre-selecting the parameters of a metal/alloy welding process independent of the spectral properties of a cover gas comprise: determining the spectrum of an electronic transition of the metal/alloy vapor by analyzing an emission spectrum of a metal/alloy welding process using a broad bandwidth energy source or obtaining this information from literature;

and selecting a laser wavelength and linewidth outside the spectrum of any electronic transition of the metal/alloy vapor. However, if selecting a laser wavelength and linewidth outside the spectrum of any electronic transition of the metal/alloy vapor is not possible, laser wavelength and linewidth is modified that way that interactions with lines of high oscillator strength are minimized. It should be noted that high oscillator strength generally means that the probability for the absorption of a photon of a certain wavelength is high A metal/alloy system that can immediately benefit from the present invention is titanium or a titanium alloy which can be used e.g. in medical applications for manufacturing medical devices requiring clean welds. As provided herein below, avoidance of the spectrum of titanium vapor in a plasma plume results in a weld substantially free of detritus. While the '626 APP spoke of minimizing soot, Applicants recognize that soot and other contaminants may be causing weld coloration (resulting from oxidation, particle deposition and similar effects or their combinations), hence use of the term detritus in lieu of soot.

The present invention further provides a method of creating a metal/alloy weld in a workpiece independent of the spectrum of a cover gas. This method includes selecting one of a number of spectral bandwidths that avoids the spectrum of an electronic transition of a metal/alloy vapor. In particular, it is preferred that a method of creating a metal/alloy weld in a workpiece independent of the spectrum of a cover gas, the method comprises following steps: selecting one of a number of spectral bandwidths that avoids the spectrum of an electronic transition of a metal/alloy vapor; providing a spectrally-stable laser with power sufficient to create a weld pool with one of said spectral bandwidths; and subjecting the work piece with an output from said laser sufficient to create a weld. It is clear that this requires the practice of the abovementioned pre-selection analysis.

To implement the weld, one must provide a spectrally-stable laser with power sufficient to create a weld pool with one of said spectral bandwidths with an output power sufficient to create the weld.

It is especially preferred that the metal/alloy is titanium or a titanium alloy.

In another preferred embodiment of the method of creating a metal/alloy weld, the weld is characterized by being substantially free of coloration from plasma detritus.

It is further preferred that the weld track is characterized by being substantially free of geometrical height or width fluctuations. Weld tracks possess more or less periodic height fluctuations along the laser weld line. These fluctuations are induced by fluctuations of the heat flow during the solidification of material strongly influenced by the fluctuations of absorbed laser light.

In yet another preferred embodiments of the method of creating a metal/alloy weld, the real time detected signals from the welding process are substantially free of absorption based disturbances. Signal detection during welding processes is perturbed by signals coming from the metal vapor plume laser light interaction. Therefore reducing the absorption in the vapor plume will increase substantially the signal detection quality. The latter by reducing the strength or even the presence of the signal.

While the experiments performed to date concern use of titanium and titanium alloys, the present invention is not so limited to these materials only. It is contemplated that the physics of the titanium plumes described herein are applicable for other metal/alloy materials or systems.

The focus of the present invention is to avoid creation of welds that suffer from coloration, such coloration due to detritus thrown off from the plasma. As the experimental results clearly provide, manipulation of the spectrum of the laser so as to avoid the metal/alloy vapor results in a plume geometry is different than where there is interference.

The present invention also provides a narrowband fiber laser, especially a multimode fiber laser with stable narrowband beam emission, which is customized to produce laser beam with necessary parameters. This fiber laser includes fiber Bragg gratings pre-selected to emit an output in a pre-determined narrow spectral bandwidth, the narrow bandwidth corresponding to a spectral bandwidth that avoids the spectrum of an electronic transition of metal/alloy vapor-determined as provided hereinabove—an active fiber configured to suppress non-linearities; and diode lasers configured to pump the active fiber so it can lase in the narrow bandwidth. Suppression of the non-linearities is an important aspect of the present invention as the laser must reliably emit in a narrow bandwidth and the prior art single mode lasers configured for this required additional componentry to accomplish this. As mentioned above, a cost-efficient and uncomplicated example of such narrowband fiber laser system can be found in the international application PCT/US2014/40754 which was published as WO 2014/197509 A1 on 11 Dec. 2014 and which content is explicitly incorporated into the present application by reference in order to avoid repetitions.

Just in summary, PCT/US2014/40754 discloses an oscillator having a Fabry-Perot configuration. In particular, the disclosed oscillator is configured with a multiple transverse mode or simply multimode ("MM") step-index active fiber. The opposite ends of the active fiber are coupled to respective MM passive fibers. The resonant cavity is defined between two MM fiber Bragg gratings written in respective cores of MM passive fibers. As known, one of the main reasons for line broadening in single mode (SM) fiber lasers is the presence of so-called nonlinear effects ("NLE"), such as Raman scattering and four wave mixing, which become more pronounced with the power increase. The threshold for NLE can be lowered by increasing a core diameter and cavity length. Hence MM fibers characterized by large diameter cores and smaller cavity lengths are characterized by relatively narrow spectral linewidth.

Also in this case, it is preferred that the metal/alloy is titanium or a titanium alloy.

The preferred embodiment for the laser for the present invention is a multimode laser with a large mode area active fiber so as to minimize the non-linearities and provide a simple oscillator that can provide an efficient and economic system for welding using a narrow bandwidth output.

It is further preferred that the laser is configured to provide a multi-mode output.

In another embodiment for the laser according to the present invention it is preferred that a central wavelength of the narrow spectral bandwidth is in a range from 1020 nm to 1090 nm.

In yet another embodiment it is preferred that a central wavelength of the narrow spectral bandwidth is in a range from 1400 nm to 2100 nm.

DETAILED DESCRIPTION

FIGS. 1 to 8 illustrate different aspects related to the present invention, namely:

Applicants maintain that the research associated with the present invention demonstrates that the coloration effect on the prior art welds identified in the '626 APP actually are a result from the dynamics of the plume expansion.

Figure 3:
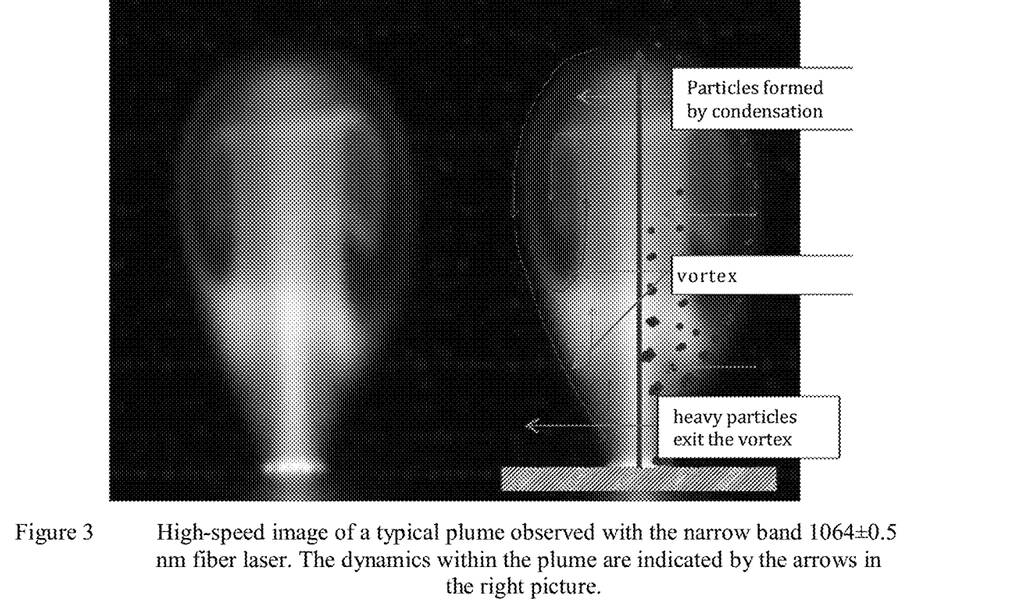
FIG. 3 is a high-speed image of a typical plume observed with the narrow band 1064±0.5 nm fiber laser. The dynamics within the plume are indicated by the arrows in the right picture.

The plume expands from the weld forming a vortex and the particles that cannot follow the vortex are deposited around the weld (as shown in FIG. 3).

Figure 4:
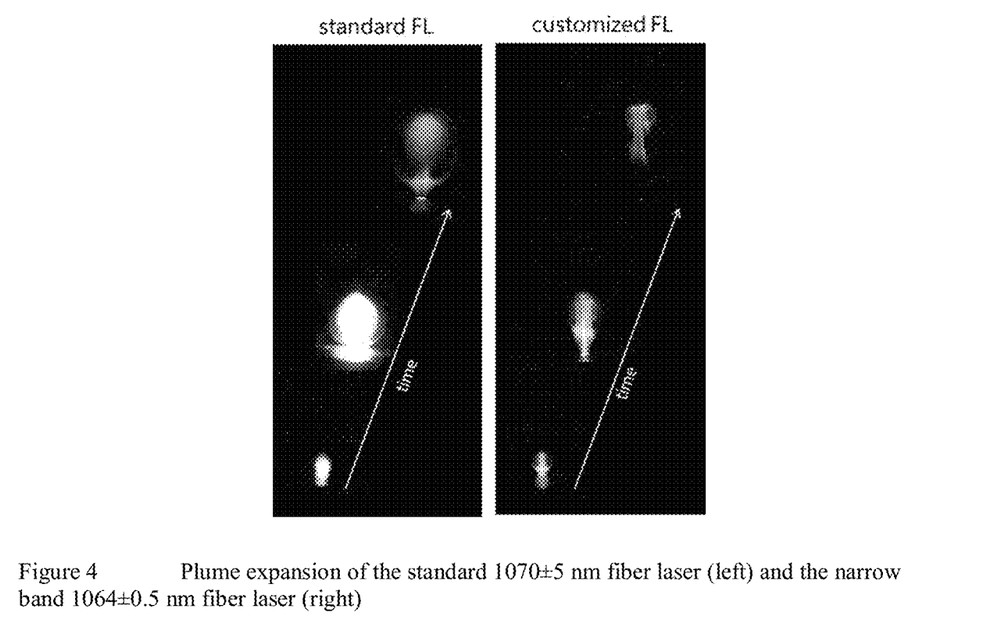
FIG. 4 illustrates a plume expansion of the standard 1070±5 nm fiber laser (left) and the narrow band 1064±0.5 nm fiber laser (right)

The direct comparison of the plume expansion between the laser giving the bad and good visual weld quality (standard 1070±5 nm vs. narrow linewidth laser 1064±0.5 nm laser) shows that the plume of the standard laser is much brighter and compact, forming one big vortex circulating above the weld material (FIG. 4). This results in increased particle deposition around the weld, leading to the poor visual quality.

Spectral analysis of the emitted light of the laser plume have shown that no emissions from the cover gas (Argon) are observed. In addition, in the plume of the 1064±0.5 nm laser only species of neutral Titanium are present (Titanium atoms, Ti I). So the plume consists of Titanium vapor only ("vapor plume").

In the plume of the 1070±5 nm laser species of neutral Titanium (Ti I) as well as Titanium ions (Ti II) are present ("plasma plume").

The present invention provides that ionization of titanium takes place when using the standard 1070±5 nm laser and that the resulting plasma plume shows significantly different expansion properties compared to the vapor plume, resulting in increased particle deposition and thus weld coloration.

To avoid unfavorable plume expansion dynamics, ionization of the plume has to be avoided.

Ionization can take place by interaction of the laser light with electronic transitions of the vapor (in this case Titanium). Therefore, the energy levels of the electronic transitions have to meet the laser wavelength.

The NIST atomic spectra database (cf Kramida, A., Ralchenko, Yu., Reader, J., and NIST ASD Team (2015). NIST Atomic Spectra Database (ver. 5.3), [Online]. Available: http://physics.nist.gov/asd [2016, Aug. 18]. National Institute of Standards and Technology, Gaithersburg, MD.) lists 12 spectral lines for Titanium vapor (Ti I) and 7 spectral lines for Titanium ions (Ti II) falling into wavelength range of the off-the-shelf fiber laser (1065-1075 nm).

This NIST atomic spectra database lists no spectral lines for Titanium vapor (Ti I) or Titanium ions (Ti II) falling into wavelength range of the narrow band laser (1063.5-1064.5 nm). Another example of the literature providing information on spectral lines relevant substances is a so-called Kurucz linelist which is available under http://kuruez.harvard.edu/linelists/gfnew/. This list reveals additional information on the electronic levels of Titanium. While NIST database lists 12 spectral lines for Titanium vapor (Ti I) in the wavelength range of the off-the-shelf fiber laser (1065-1075 nm), the Kurucz linelist provides data on 99 lines in this range.

Argon (cover gas) plays no role in the ionization of the plume (no Argon emissions observed). This is further supported by Outred (cf. M. Outred, Tables of Atomic Spectral Lines for the 10000A to 40000A Region, J. Phys. Chem. Ref. Data 7, 1 (1978)) who reports the presence of Argon lines at 1063.8 and 1064.0 nm which falls in the range of the narrow band fiber laser giving a good visual weld quality.

To prove that the interaction of neutral Titanium (Titanium vapor) is responsible for the ionization and that interactions with Titanium ions (plasma) as well as the lines of the cover gas play a secondary role, an additional fiber laser with narrow emission between 1070.6-1071.6 nm was built by the Applicant IPG Photonics Corp.

The NIST atomic spectra database lists no spectral lines for Titanium vapor (Ti I) and one spectral line for Titanium ions (Ti II) in this wavelength range.

Figure 5:
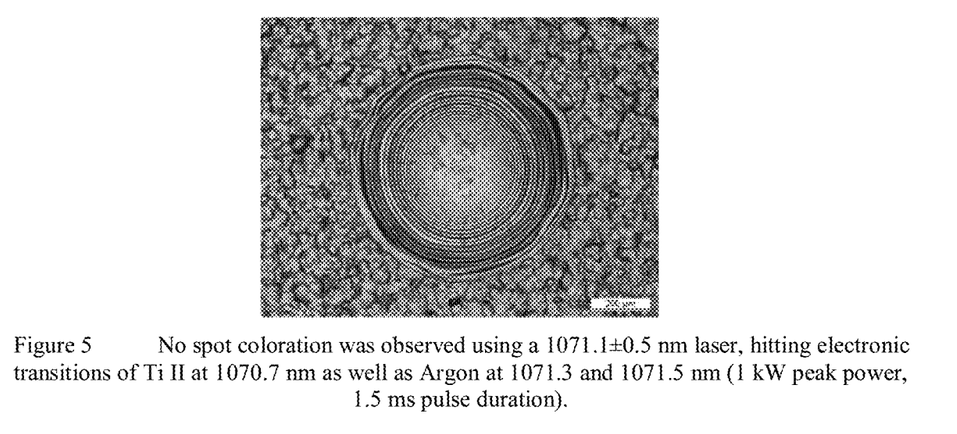
FIG. 5 shows that no spot coloration was observed using a 1071.1±0.5 nm laser, hitting electronic transitions of Ti II (wherein Ti II stands for ions and Ti I stands for Ti atoms, as explained below) at 1070.7 nm as well as Argon at 1071.3 and 1071.5 nm (1 kW peak power, 1.5 ms pulse duration).

The above mentioned publication by Outred lists two spectral lines for Argon in this wavelength range. Thus, the laser hits all transitions considered relevant (cover gas lines, Titanium ions) in the '626 APP, but a good visual weld quality could be obtained (FIG. 5).

The generality of the principle (avoiding ionization because of laser vapor interaction) was strengthened by observing the same effect using a different material than Titanium. An example for such a material Zirconium (Zr).

Outred (cf above reference) reports eleven spectral lines for Zr I falling into the wavelength range of the off-the-shelf fiber laser (1065-1075 nm). No lines are reported within the wavelength range of the narrow band laser (1063.5-1064.5 nm).

Figure 6:
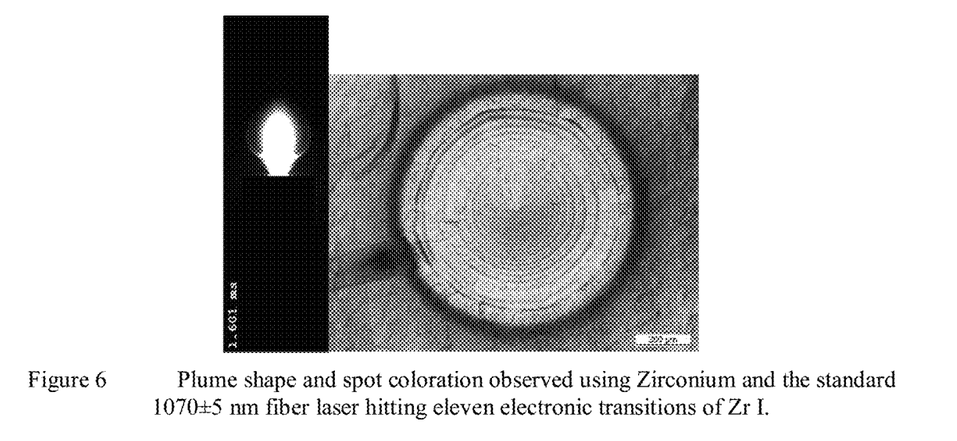
FIG. 6 illustrates a plume shape and spot coloration observed using Zirconium and the standard 1070±5 nm fiber laser hitting eleven electronic transitions of Zr I (i.e. Zirconium atoms in the gas phase).
Figure 7:
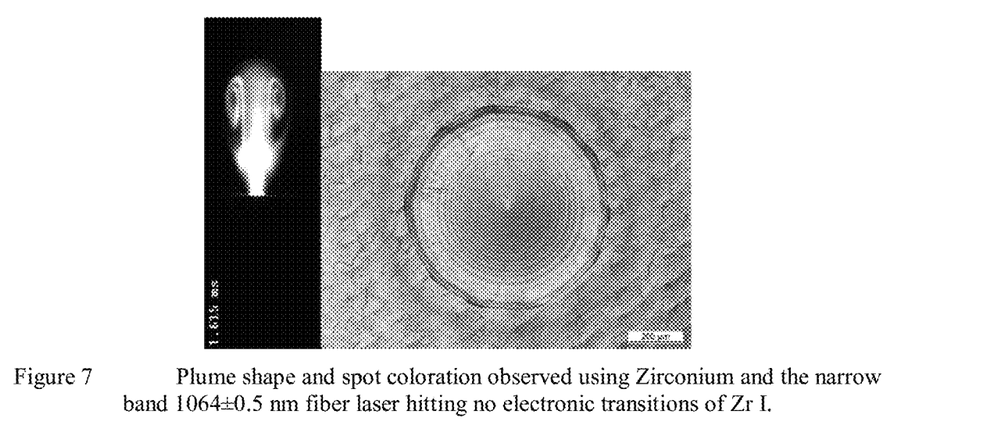
FIG. 7 illustrates a plume shape and spot coloration observed using Zirconium and the narrow band 1064±0.5 nm fiber laser hitting no electronic transitions of Zr I.

FIG. 6 shows the plume shape and spot coloration using the off-the-shelf laser while FIG. 7 shows the plume shape and spot coloration of the narrow band laser (1063.5-1064.5 nm).

The findings are in agreement with the previously shown results for Titanium.

The above experiments allow the Applicants to draw a number of conclusions.

The coloration originates from the deposition of Titanium particles around the weld.

Particle deposition depends on the plume expansion: A fast plume expansion gives a better visual quality than a slow plume expansion.

The interactions of the laser emission with the electronic levels of Titanium vapor (neutral atoms, Ti I) leads to ionization of Titanium, forming Titanium ions and free electrons. This plume can now be called plasma.

In comparison to the vapor plume, the plasma plume shows a different expansion behavior: it is more compact and expands very slowly. As a result, more particles are deposited around the weld, causing the strong coloration.

Thus, ionization (creation of a plasma plume) of the plume has to be avoided.

Therefore, the spectrum of the laser output should not interfere with the spectrum of any of the electronic transitions of the vapor (neutral atoms) of the material being welded. When the laser wavelength and energy levels do not match, no interaction and thus no photoionization will take place.

Figure 9:
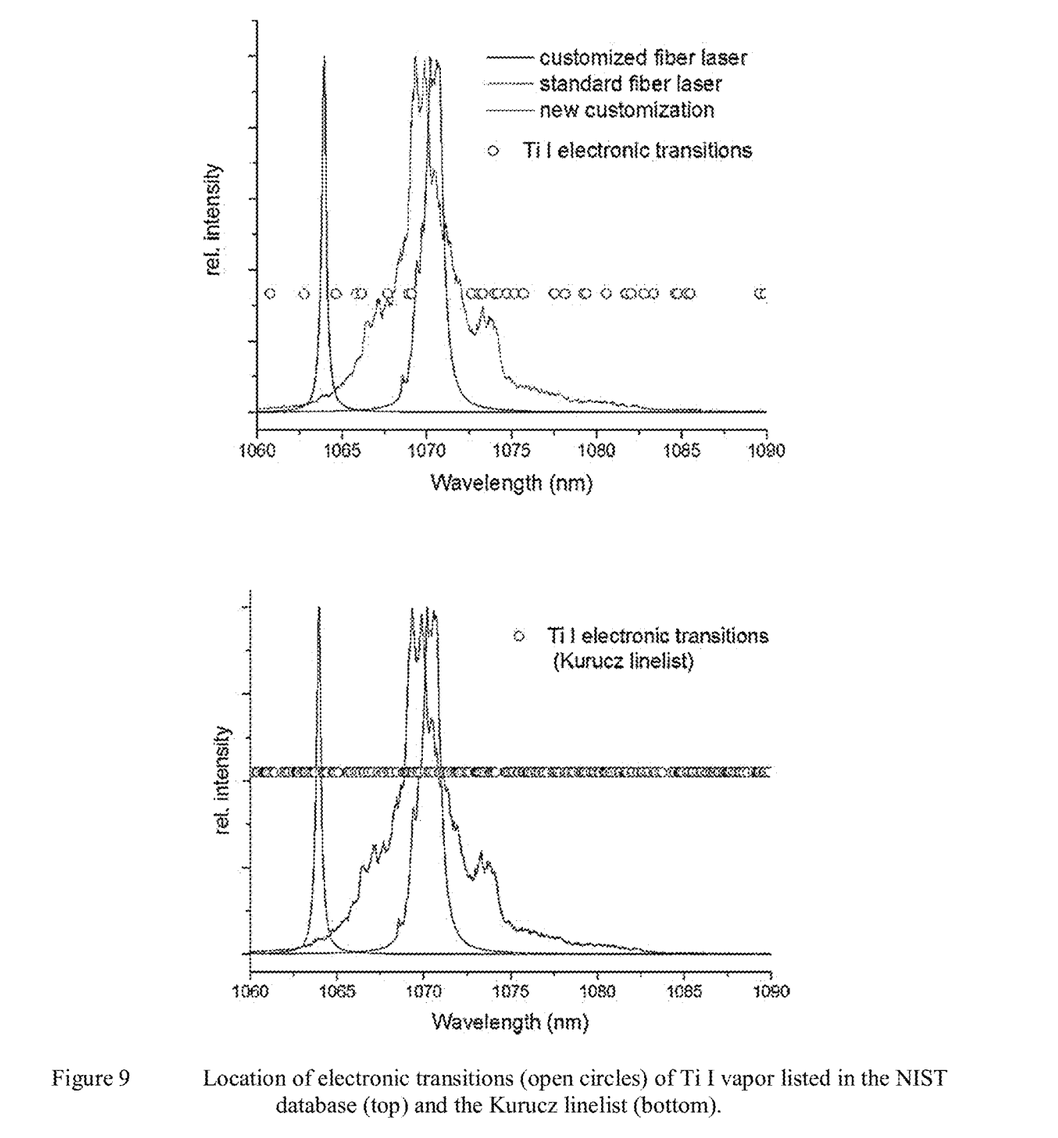
FIG. 9 illustrates location of electronic transitions (open circles) of Ti I vapor listed in the NIST database (top) and the Kurucz linelist (bottom).

However, review of an alternative database than the NIST Atomic Spectra Database, for example the Kurucz linelist, reveals additional information on the electronic levels of Titanium. While NIST lists 12 spectral lines for Titanium vapor (Ti I) in the wavelength range of the off-the-shelf fiber laser (1065-1075 nm), the Kurucz linelist provides data on 99 lines in this range. As a consequence, it would be extremely difficult to provide a fiber laser which does not hit any of those transitions (as shown in FIG. 9). In such situations, a so-called absorption efficiency, which is also known as oscillator strength, becomes important:

It is possible that some electronic transitions absorb the laser radiation more efficient than others. So it could happen that a good visual weld quality is obtained despite electronic transitions being hit. However assessing this absorption efficiency requires extensive investigations. So avoiding every transition (if possible) is just the easiest way. Since the oscillator strength (log gf) is also reported in the Kurucz list, the identification of important lines becomes possible.

Figure 10:
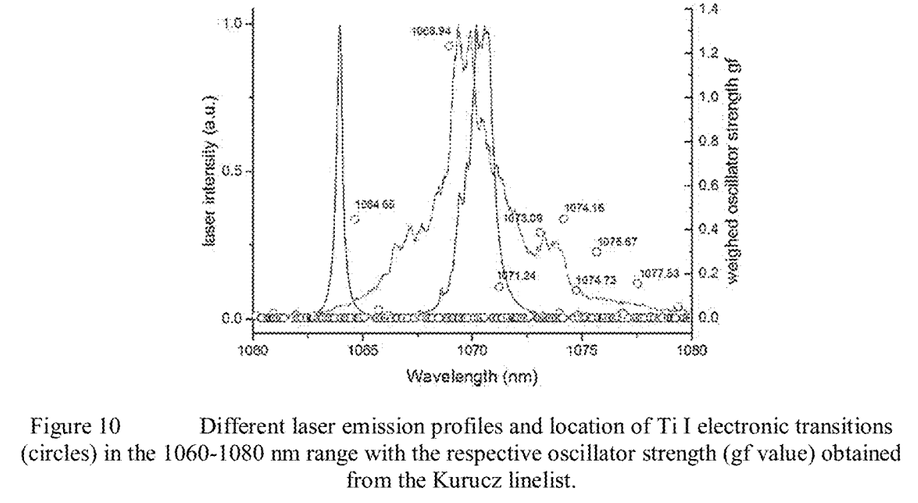
FIG. 10 illustrates different laser emission profiles and location of Ti I electronic transitions (circles) in the 1060 to 1080 nm range with the respective oscillator strength (gf value) obtained from the Kurucz linelist.
Figure 11:
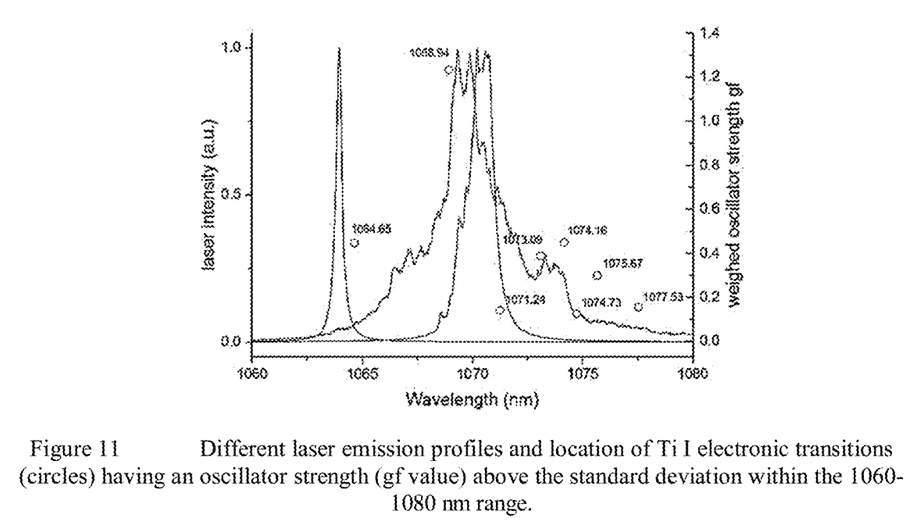
FIG. 11 illustrates different laser emission profiles and location of Ti I electronic transitions (circles) having an oscillator strength (gf value) above the standard deviation within the 1060-1080 nm range.

For example, a fiber laser may be tuned in the 1060-1080 nm range for Ti welding. With all the data known from literature, there is no "gap" of electronic transition where the fiber laser could be tuned to (FIG. 9). Thus, important transitions have to be identified by laboratory experiments or by using data available in literature (determination of oscillator strength). In case of Titanium, oscillator strength values can be obtained for the Kurucz list (FIG. 10). An important line may now be defined as a line with a gf-value (linear scale, not log gf) above the standard deviation of all gf-values within the selected wavelength range (FIG. 11). Finally, the emission profile of the laser is modified to avoid those "important" wave-lengths as much as possible.

Therefore, if selecting a laser wavelength and linewidth outside the spectrum of any electronic transition of the metal/alloy vapor is not possible, laser wavelength and linewidth is modified so according to this invention that way that interactions with lines of high oscillator strength are minimized.

Interactions of the laser with the ions play a secondary role, because the ions have to be present to make this interaction happen. However, when they are present, it's already too late.

No evidence for an interaction between the laser/cover gas could be found.

Figure 8:
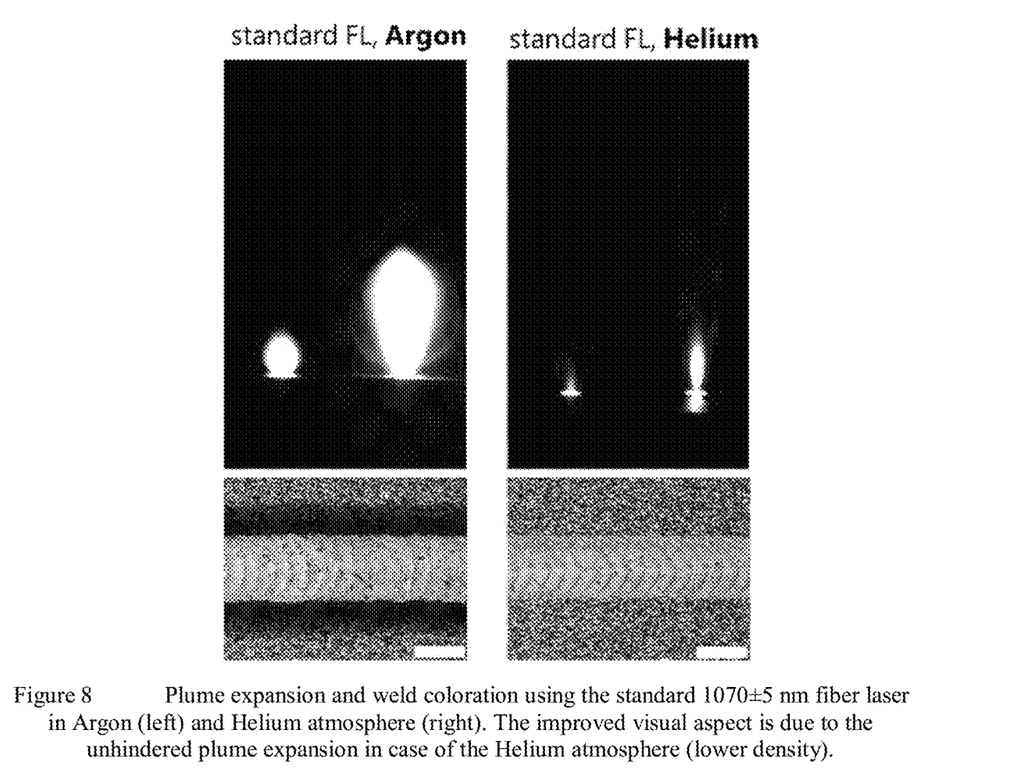
FIG. 8 illustrates a plume expansion and weld coloration using the standard 1070±5 nm fiber laser in Argon (left) and Helium atmosphere (right). The improved visual aspect is due to the unhindered plume expansion in case of the Helium atmosphere (lower density).

Nevertheless the cover gas will influence the plume dynamics because of differences in gas density. For example Helium (10× lower density Argon) allows the plume to expand more easily and gives a good visual weld quality (see FIG. 8). But this has nothing to do with a laser/gas interaction.

Figure 12:
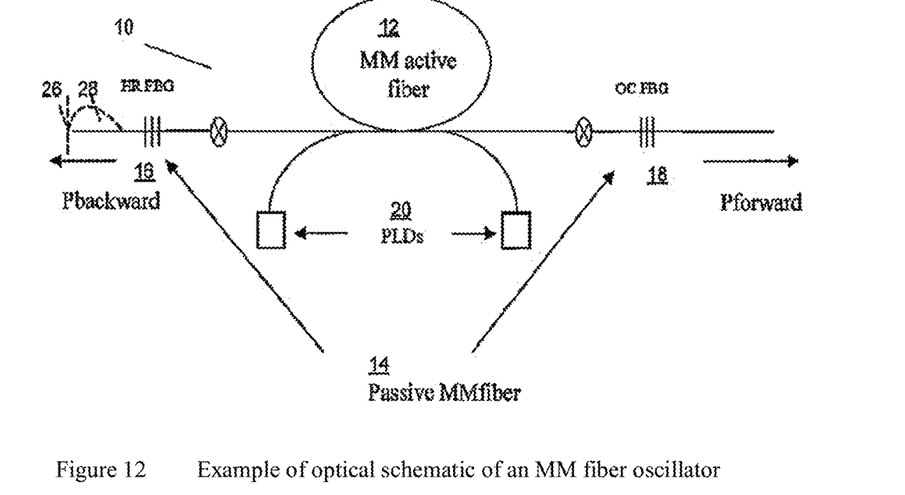
FIG. 12 shows an optical schematic of the disclosed MM fiber oscillator.

Finally FIG. 12 illustrates a multimode ("MM") fiber laser or oscillator 10 configured with a gain medium which includes a MM fiber 12 doped with light emitters which can be used in accordance with the present invention. As known, the light emitters include ions of rare earth elements selected from ytterbium ("Yb"), erbium ("Er"), neodymium ("Nd"), thulium ("Tm"), holmium ("Ho"), praseodymium ("Pr"), cerium ("Ce") yttrium (Y3+), samarium (Sm3+), europium (Eu3+), gadolinium (Gd3+), terbium (Tb3+), dysprosium (Dy3+), and lutetium (Lu3+) and various combinations of these.

The active step index fiber 12 is configured with a core capable of supporting a great number of transverse modes typically associated with a core diameter greater than 20. As one of ordinary skill in the fiber laser art knows, a step-index fiber cannot continue to support a single mode once its core diameter exceeds a 30 μm diameter. The configuration of active fiber 12 further may have one or more claddings which surround the core in a manner well known to one of ordinary skill.

The oscillator 10 is further configured with two MM passive fibers 14 fused to respective opposite ends of active fiber 12. The MM passive fibers each are configured with a core diameter and numerical aperture substantially matching those of the active fiber 12. A pump 20 includes one or a plurality of MM pigtailed laser diodes arranged in a side-pumping scheme and having an emission peak which corresponds to the absorption peak of the selected doping ions. The combination of passive, active and pump fibers combined as shown in FIG. 12 and, optionally, placed in a housing (not shown) constitutes a single gain block.

The laser 10 has a Fabry-Perot configuration with a resonant cavity defined between spaced strong and weak reflectivity MM fiber Bragg gratings ("FBGs") 16 and 18, respectively. The FBGs 16 and 18 are written in respective MM passive fibers 14. While FBGs can be written in the active fiber, it may be technologically challenging.

Multi-kilowatt implementation of single mode ("SM") high power fiber lasers has been achieved and is already available on the market. The state of the art demonstration of continuous wave SM operation is currently about 10 kW and prediction of SM operation levels exceeding 30 kW have been made. While the capability of fiber lasers to maintain an excellent beam quality at high power is undisputed, there is little concern of the laser linewidth as they generally used for processing of materials that have broad absorption band.

However, certain applications require a selective spectral line. The spectral linewidth of the laser light should to be narrowed to avoid the absorption peak which may be realized e.g. by a high cost, single frequency SM fiber laser.

As known, one of the main reasons for line broadening in SM fiber lasers is the presence of nonlinear effects ("NLE"), such as Raman scattering and four wave mixing, which become more pronounced with the power increase. The threshold for NLE can be lowered by increasing a core diameter and cavity length. Hence MM fibers characterized by large diameter cores and smaller cavity lengths are characterized by relatively narrow spectral linewidth.

Figure 12A:
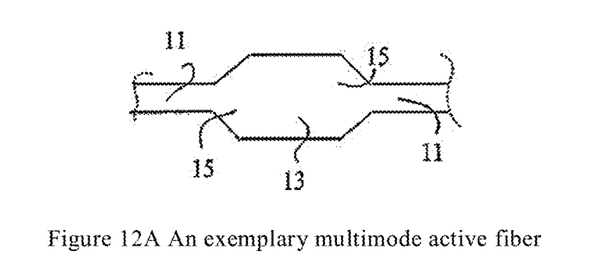
FIG. 12A shows an exemplary multimode active fiber which may be used therein.

The active MM fiber 12 of the present disclosure fully meets the requirement for a relatively high NLE threshold. In one embodiment, the configuration of the MM active fiber 12 may include a typical cylindrical fiber. In the other embodiment, the active fiber may be configured with a double bottleneck shape, as shown in FIG. 12A, which has two relatively small diameter input and output core regions 11, a central relatively large diameter central amplifying core region 13 and two tapered regions 15 bridging the opposite ends of the central region with respective opposing ends of the ends core regions. The increased diameter of amplifying region is instrumental in a further increase of core diameter, reduction of fiber length and ultimately elevation of NLE threshold and narrowing of spectral linewidth. The cladding of MM active fiber shown in FIG. 12A may be configured with a typical cylindrically shaped cross-section or may have the same double bottleneck shape as the core. The spectral linewidth that would meet many industrial requirements, such certain types of material laser processing, for the disclosed laser may vary from 0.02 nm to about 10 nm. The desired spectral line may be obtained by careful selection of, among others, the core diameter, length of resonant cavity, configuration of MM Bragg gratings, dopant concentration.

The invention claimed is:

1. A narrowband fiber laser comprising:
    a. first and second fiber Bragg gratings pre-selected to emit an output in a pre-determined wavelength range and linewidth range, the narrow bandwidth linewidth range corresponding to a spectral bandwidth that avoids the spectrum of an electronic transition of metal/alloy vapor, wherein the predetermined wavelength range and linewidth range does not interfere with any spectral lines of the metal/alloy vapor having an oscillator strength value above the standard deviation of the range of oscillator strength values for spectral lines of the metal/alloy vapor, wherein a central wavelength of the predetermined wavelength range is in a range from 1400 nanometers (nm) to 2100 nm;
    b. an active fiber configured to suppress non-linearities disposed between the first and second fiber Bragg gratings; and
    c. one or more diode lasers configured to pump the active fiber so it can lase in the predetermined wavelength range and linewidth.

2. The fiber laser of claim 1, wherein the metal/alloy vapor includes titanium or a titanium alloy.

3. The fiber laser of claim 1, wherein the active fiber is a large mode area active fiber.

4. The fiber laser of claim 3, wherein the laser is configured to provide a multi-mode output.

5. The fiber laser of claim 1, wherein the active fiber includes a cylindrical shaped optical fiber.

6. The fiber laser of claim 1, wherein the active fiber is characterized by a double bottleneck shape that includes a central amplifying core region disposed between an input core region and an output core region, wherein the input and output core regions are of smaller diameter than the central amplifying core region, and two tapered regions bridging the opposite ends of the central region with respective opposing ends of the input and output core regions.

7. The fiber laser of claim 6, wherein the active fiber further includes a cladding.

8. The fiber laser of claim 7, wherein the cladding is characterized by a cylindrical cross-section.

9. The fiber laser of claim 7, wherein the cladding is characterized by a double bottleneck shape.

10. The fiber laser of claim 1, wherein the active fiber is doped with light emitters.

11. The fiber laser of claim 10, wherein the light emitters include ions.

12. The fiber laser of claim 11, wherein the ions include one or more ions selected from the group of ytterbium ("Yb"), erbium ("Er"), neodymium ("Nd"), thulium ("Tm"), holmium ("Ho"), praseodymium ("Pr"), cerium ("Ce") yttrium (Y3+), samarium (Sm3+), europium (Eu3+), gadolinium (Gd3+), terbium (Tb3+), dysprosium (Dy3+), lutetium (Lu3+) and combinations of two or more of these.

13. The fiber laser of claim 11, wherein the one or more laser diodes emit radiation characterized by an emission peak corresponding to an absorption peak of the one or more ions.

14. The fiber laser of claim 1, wherein the linewidth is between 0.02 nanometers (nm) and 10 nm.

15. The fiber laser of claim 1, wherein the one or more diode lasers are arranged in a side pumping scheme.

16. The fiber laser of claim 1, wherein the one or more laser diodes are coupled to the active fiber by one or more corresponding passive fibers configured with a core diameter and numerical aperture substantially matching those of the active fiber.

17. The fiber laser of claim 16, wherein the active fiber is a multimode fiber.

18. The fiber laser of claim 17, wherein the one or more corresponding passive fibers include one or more multimode fibers.

* * * * *